3,246,917
FLEXIBLE DIAPHRAGM TYPE CONDUIT SEAL
Joseph L. Martin, Wadsworth, Ohio, assignor to The R-W
Mfg. Co., Barberton, Ohio, a corporation of Ohio
Filed Apr. 3, 1963, Ser. No. 270,295
4 Claims. (Cl. 285—47)

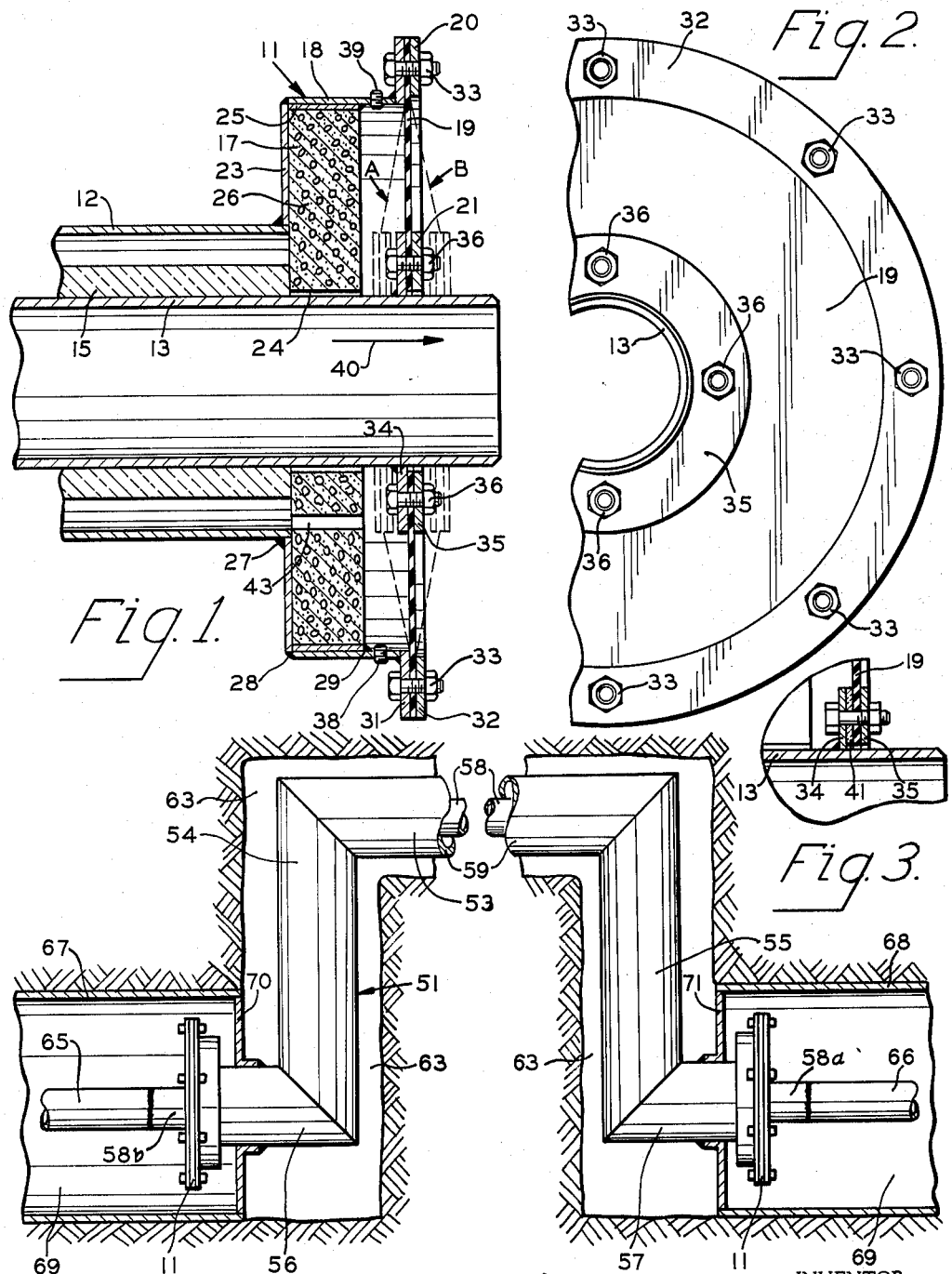
April 19, 1966     J. L. MARTIN     3,246,917
FLEXIBLE DIAPHRAGM TYPE CONDUIT SEAL
Filed April 3, 1963
INVENTOR.
JOSEPH L. MARTIN
BY
ATTORNEYS.

The present invention relates generally to conduit systems and more particularly to a mechanism for effecting a seal between a fluid conducting pipe and a surrounding casing.

The conduit seal of the present invention is particularly suitable for use with conduit systems used for transporting steam and other fluids at varying temperatures and/or temperatures differing from ambient temperatures. Such conduit systems are often constructed of prefabricated units where each unit comprises a fluid conveying pipe, surrounded by a tube of insulating material, which in turn is surrounded by an outer casing. The pipe and casing are held in appropriate radially spaced relationship by suitable pipe supports.

Since such units are subject to variations in temperature they are also subject to expansion and contraction. For this reason expansion absorbing devices such as loops and joints are provided at spaced locations along the conduit system. In order to assure proper distribution of the conduit expansion and contraction among the various expansion devices, the system is anchored at spaced locations with suitable anchors such as that shown in United States Patent No. Re. 22,988, issued to William S. McLeish.

When the conduit system passes through the wall of a building, a pit, or a manhole, the outer casing usually terminates at such wall and only the fluid conveying pipe extends beyond the inner face of the wall. A conduit seal is provided between the fluid pipe and the outer casing to prevent the entry of moisture and other contaminants which lessen or even destroy the insulating ability of the insulating material surrounding the pipe. Where the conduit terminates five feet or less from an anchor point there is little relative movement between the pipe and the casing and an ordinary end seal is sufficient. Such an end seal is often a plate which is fixed as by welding to both the pipe and the conduit in a fluid tight relation. Where the conduit terminates more than five feet from an anchor point the conduit seal must permit expansive movement of the pipe relative to the casing. Seals suitable for this purpose are called "gland" seals.

Prior gland seals generally comprise a packing material surrounding the pipe, a stuffing box structure connected to the outer casing and surrounding the pipe, and an annular member movable relative to the stuffing box to compress the packing between the stuffing box and the pipe to effect a seal. The problem with prior gland seals is that they require maintenance and frequent repacking. In addition, it has been found that such packing-type of gland seals do not absolutely prevent the entry of water and other fluids. This failure to seal completely is often because the heat from the pipe causes the packing material to harden, thus destroying its sealing qualities. It has been found that even frequent maintenance and repacking of these gland seals does not assure an absolute and positive seal against fluid entry, especially where the building or manhole happens to flood and the terminal end of the conduit casing remains submerged for long periods of time.

The present invention provides a conduit seal construction which functions as a gland seal and provides a positive barrier against the entry of any fluid or contaminate. Basically, the present gland seal comprises an annular pipe guide and support member which is fixed to the terminal end of the casing and includes an inner surface which slidably supports and positions the pipe relative to the casing. An outer surface of the guide and support member extends longitudinally away from the conduit beyond the body of the guide member. An imperforate pliable diaphragm extends from the outer surface of the guide member to the pipe and is connected to both in a fluid tight relation. The connection of the diaphragm to the pipe is preferably axially spaced from the connection to the outer surface of the guide and support member in a direction opposite of expected pipe expansion.

An important advantage of the present gland seal is that it provides a positive barrier against the entry of moisture and other contaminates. The present gland seal prevents flooding of the conduit no matter how long the terminal end of the conduit casing may remain submerged. In addition, the present gland seal does not require the packing material used in prior gland seals and is, therefore, essentially maintenance-free.

Another important advantage of the present gland seal is that the diaphragm electrically isolates the inner pipe from the casing. This is especially important where the conduit system is buried and cathodic protection is used. If anodes are used to protect the casing from corrosion, electrically isolating the casing from the pipe by means of the present gland seal makes it unnecessary to use insulating type unions at the terminal ends of carrier pipes to isolate the buried line from piping inside a building.

The present conduit seal construction is also usable as a watershed over the terminal end of the casing on risers, i.e., vertically disposed conduits. When the present conduit seal is used as a watershed the guide and support member may be modified to permit the pipe to move laterally relative to the casing and so that only the diaphragm connects the pipe to the casing. The diaphragm electrically and thermally isolates the pipe from the casing.

Finally, the present conduit seal finds particular application as part of a prefabricated, expansion device having its fluid conveying pipe protected and sealed from contact from water and other corrosive substances so that it may be connected to and buried with underground piping systems. This prefabricated expansion device may be used as a replacement unit for buried expansion pipe devices which have corroded and deteriorated due to the contact of water with the pipe. In many existing conduit systems the expansion device is an expansion loop of the fluid pipe alone which is disposed in a trench and surrounded with an insulating type concrete or other suitable insulating fill. In such fill-type systems the void required between the insulating fill and the pipe to permit expansive movement of the pipe often fills with water and eventually causes failure of the pipe due to corrosion. Thus, it is often necessary to replace the pipe in the expansion loop many years before it is necessary to replace the pipe in the straight runs.

The present invention provides a prefabricated replacement unit which eliminates the problem of water and other corrosive substances filling around the pipe. In the present expansion device an outer casing is provided around the expansion pipe and two of the present conduit seals are provided at each end of the expansion device to close off the opening between the pipe and the casing and thereby seal the expansion device against the entry of corrosive substances. The conduit seals require no maintenance and the expansion device may be buried in the trench used for the prior expansion device.

Accordingly, it is an object of the present invention to provide a new and improved conduit seal which provides a positive barrier against the entry of fluids and other contaminates between the casing and the pipe.

Another object of the present invention is to provide a new and improved conduit seal which is essentially maintenance-free.

Yet another object of the present invention is to provide a new and improved conduit seal which is simple in construction.

Still another object of the present invention is to provide a new and improved conduit seal which electrically isolates the pipe from the casing of the conduit.

And still another object of the present invention is to provide a new and improved conduit seal which is usable as a watershed and electrically and thermally isolates the pipe from the casing of the conduit.

A further object of the present invention is to provide prefabricated expansion device for connection to existing straight runs of pipe and having the pipe in the expansion device protected and sealed from the surrounding environment.

Other objects and a fuller understanding of the invention may be had by referring to the following description and claims taken in conjunction with the accompanying drawings in which:

FIGURE 1 is a longitudinal view, in cross section, of a conduit having the gland seal construction of the present invention.

FIGURE 2 is a fragmentary end view of the gland seal of FIGURE 1.

FIGURE 3 is a fragmentary longitudinal view, in cross section, of a second form of the gland seal of FIGURE 1.

FIGURE 4 is a plan view of an expansion loop constructed according to the present invention and disposed in the trench of a prior expansion loop it is replacing.

Referring now to the drawing, a preferred form of a gland seal constructed according to the present invention is indicated generally by the reference character 11. The gland seal 11 is secured to the end of a casing 12 and surrounds a pipe 13. The pipe 13 is supported in spaced-insulated relation to the casing 12 throughout the conduit system. The space between the pipe and the casing is often at least partially filled by insulating material 15 which surrounds the pipe 13.

The gland seal 11 includes a guide and support member 17, an outer longitudinally extending collar plate 18, an imperforate plastic diaphragm 19, and clamping ring assemblies 20, 21 to secure the diaphragm 19 in a fluid tight relation to the pipe 13 and the collar plate 18 respectively. The guide member 17 is a precast annular member comprising an annular back plate 23, inner and outer cylindrical side plates 24, 25 respectively, and an insulating concrete core 26. An inner circular edge of the annular back plate 23 is secured to the terminal end of the casing 12 as by a circumferential weld 27. An exposed surface of the inner cylindrical plate 24 slidably engages the pipe 13 and positions it in spaced relation to the outer casing 12. The cylindrical collar plate 18 is secured to the outer side plate 25 as by circumferential welds 28, 29. The collar plate 18 is longer in its longitudinal dimension than the outer side plate 25 and extends longitudinally beyond the support and guide member 17. Drain and vent openings are provided in the bottom and top portions of the extended portion of the collar and are closed by drain and vent plugs 38, 39 respectively. An opening 43 is provided through the concrete core 26 adjacent the casing 12 to permit drainage of the casing.

The outer clamping ring assembly 20 includes an annular flange plate 31 which is secured as by welding to the end of the collar 18 and a mating annular clamping ring plate 32 which is removably secured to the annular flange plate 31 by a plurality of radially spaced fasteners 33. The inner clamping ring assembly 21 includes an annular flange plate 34 fixed to the conduit 13 as by welding, and an annular clamping ring plate 35 removably secured to the flange plate 34 by a plurality of radially spaced fasteners 36.

The diaphragm 19 is made of an elastomeric material so as to be pliable or plastic and is imperforate except for holes for the fasteners 33, 36. A preferred material is silicon rubber because of its ability to withstand high temperatures of approximately 500° F. The diaphragm 19 extends radially from the pipe 13 to the outer flange plate 31. The clamping rings 32, 35 secure the diaphragm to the flange plates 31, 34 respectively. The seal provided by the clamping ring assemblies 20, 21 and the diaphragm 19 is fluid-tight and a hermetic seal. In addition, the diaphragm 19 assures electrical isolation of the pipe 13 from the casing 12 since there is no metallic connection between them.

The inner ring assembly 21 may be located axially ahead or behind the outer ring assembly in either phantom position A or B depending upon the direction of expected pipe movement. To illustrate, if the pipe movement is expansion and is in the direction indicated by the arrow 40 in FIGURE 1, then the inner ring assembly 21 is secured to the pipe 13 in the phantom position A which is on the guide member side of a perpendicular drawn from the pipe 13 to the outer ring assembly 20. As the pipe 13 expands the diaphragm and the inner ring assembly 21 move from the phantom position A toward the solid line position and is able to move to at least the phantom position B before stretching the diaphragm beyond its elastic limits. This off-center arrangement thus allows a great deal of pipe expansion before the diaphragm 19 is extended beyond its elastic limits.

In an alternative form of the gland seal 11 shown in FIGURE 3, an annular insulating member 41 of asbestos is disposed between the diaphragm 19 and the inner flange plate 34. The asbestos member 41 provides a heat barrier between the annular flange plate 34 and the diaphragm 19 and prevents the conduction of heat from the pipe 13 to the diaphragm 19.

In FIGURE 4 a prefabricated, sealed expansion loop is indicated generally by the reference character 51. The expansion loop 51 comprises back and leg conduit sections 53, 54, 55 respectively joined at their ends to form a U-shape and short arm conduit sections 56, 57 joined to ends of the leg conduit sections 54, 55 respectively. Thus joined, the conduit sections 53–57 include an inner fluid conveying pipe 58 and an outer casing 59 in spaced relation to the pipe 58. Pipe ends 58a, 58b extend beyond the terminal ends of the casing 59 for connection to other fluid pipes. The terminal ends of the casing 59 are each connected in a fluid tight relation to the pipe 58 by the gland seal 11.

The expansion loop 51 is shown in FIGURE 4 as almost fully installed in an existing trench 63 for the expansion loop of an existing piping system. Prior to installation of the expansion loop 51 the existing conduit system comprised pipes 65, 66, outer membranes or casings 67, 68 insulating concrete or other insulating fill 69, an inverted U-shaped expansion pipe (not shown) connected to the pipes 65, 66 and centrally located in the trench 63, and an insulating fill (not shown) around the U-shaped expansion pipe.

To install the prefabricated unit 51 the prior expansion loop and its surrounding insulating fill is excavated and removed. An appropriately sized prefabricated expansion loop 51 is provided and positioned in the existing trench 63. The pipe ends 58a, 58b are connected as by welding to the existing pipe 65, 66. The metal parts of the gland seals 11 are heavily coated with a corrosion resistant compound. If casings 67, 68 exist then annular end plates 70, 71 are fixed as by welding to the conduit casing 59 and the casings 67, 68. Finally, any cavities around the gland seals 11 are filled with additional insulating fill.

Thus, the prefabricated expansion loop 51 is particularly usable in a facile method of replacing prior corroded expansion loops. Water and other contaminants cannot enter the expansion loop 51 and the pipe 58 is thus protected from corrosion. Finally, the expansion loop 51 as prefabricated is less costly to manufacture and install than prior expansion loop constructions.

As mentioned previously the conduit seal of the present invention also has application as a watershed. The watershed of the present invention is essentially the gland seal 11 with the concrete core 26 omitted so that the end of the pipe 13 is free to move laterally relative to the casing 12. In the resultant structure, the only connection of the terminal end of the pipe 13 to the casing 12 is through the diapragm 19. This provides an insulating and isolating type of watershed since the diaphragm 19 is neither a good thermal conductor nor an electrical conductor and there is no metal to metal contact between the pipe and the casing.

In conclusion, the conduit seal of the present invention may be briefly described as comprising essentially an annular support member secured to the conduit casing and including an annular portion longitudinally spaced from the end of the casing and spaced from the conduit pipe, a pliable diaphragm extending circumferentially from the conduit pipe to the annular portion, and first and second clamping means connecting the diaphragm to the pipe and the annular portion respectively in a fluid tight relation. As a gland seal the support member of the present conduit seal includes a guide portion which positions the pipe relative to the casing. The present invention further contemplates a prefabricated expansion device having the present conduit seal at each of its relatively movable ends so that the fluid conveying pipe of the expansion device is protected and sealed against contact by surrounding corrosive substances.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a conduit system having an outer casing in spaced insulated relation around an inner fluid conveying pipe mounted for expansion movement relative to the casing, an improved conduit seal for sealing the pipe to the conduit, said seal comprising:
    (a) a support guide fixed to an end of the casing, said support guide having an inner surface defining a pipe receiving and guiding opening and an outer surface radially spaced from said inner surface, and from said casing, said inner surface being in sliding engagement with the pipe;
    (b) an annular end plate extending radially outwardly from said casing, a collar member circumferentially around said support guide outer surface and including a portion extending longitudinally beyond the support guide, said collar member being spaced radially outwardly in all directions from both the casing and the pipe, said collar member being fixed to said casing by said end plate;
    (c) a first radially extending flange plate fixed to said collar member and in a plane normal to the axes of the pipe and casing collar;
    (d) a second radially extending flange plate fixed to said pipe;
    (e) an annular plastic diaphragm extending from said first flange plate to said second flange plate;
    (f) first and second means securing said diaphragm to said first and second flange plates in a fluid tight connection respectively; and,
    (g) said diaphragm providing an imperforate, annular, flexible wall between the first and second means; and,
    (h) said second flange member being in a first position within said collar member and spaced from said plane toward said support guide and end plate when the system is not in use, said second flange shifting axially when the device is in use at its intended temperature to a second position spaced from said plane away from said support guide and end plate such that said plane is between said first and second positions.

2. In a prefabricated conduit system the combination of:
    (a) first and second spaced straight run casings each including an end portion;
    (b) first and second straight run pipes positioned respectively within the first and second casings in insulated spaced relationship;
    (c) an expansion loop assembly between said straight run casings and pipes and including a loop pipe connecting the first second straight run pipes and a loop casing having end portions in telescoping relation with said end portions of the first and second straight run casings;
    (d) first and second gland seal assemblies at opposite ends of the loop assembly, each of said sealing assemblies forming first and second hermetic seals between the loop casing and the adjacent straight run pipes and casings, each of said sealing assemblies comprising:
        (i) an annular end plate connecting said end portion of the loop casing to said end portion of the straight run casing and forming a hermetic seal therebetween;
        (ii) an annular back plate secured in a hermetic connection to the smaller of the telescoped casing end portions and within the larger telescoped casing end portion, said back plate projecting radially outwardly from the smaller casing portion;
        (iii) a longitudinally extending annular collar plate fixed to the end plate in hermetic relation near the periphery thereof;
        (iv) an annular flange plate fixed to said collar plate in spaced relation with the back plate and extending radially from the collar plate;
        (v) an annular, flexible, plastic and thermal insulating diaphragm extending from said flange plate to a portion of said connected pipes surrounded by said telescoped casing end portions;
        (vi) first and second clamp means hermetically sealing said diaphragm to said pipe portion and flange plate; the outer one of said clamp means having an inner diameter greater than said smaller of said telescoped casing end portions; and,
        (vii) said plates, said diaphragm and said clamp means together forming an endless, flexible hermetic seal between said smaller telescoped casing end portion and said pipe.

3. The device of claim 2 wherein the flange plate extends radially outwardly from the collar plate and said one seal means is connected to the flange plate.

4. The device of claim 2 wherein a thermally insulating pipe support is within the collar in sliding, supporting engagement with the pipe.

References Cited by the Examiner

UNITED STATES PATENTS

| | | | |
|---|---|---|---|
| 1,015,180 | 1/1912 | Heitman | 285—229 |
| 1,798,596 | 3/1931 | Fahrney | 285—189 |
| 2,478,552 | 8/1949 | Williamson | 138—149 |
| 2,823,701 | 2/1956 | Burk | 138—149 X |
| 2,903,017 | 9/1959 | Cotman | 138—113 |

FOREIGN PATENTS 597,729 9/1959 Italy.

CARL W. TOMLIN, *Primary Examiner.*